United States Patent
Sakurada (10) Patent No.: US 9,004,751 B2
(45) Date of Patent: Apr. 14, 2015

(54) FAULT DIAGNOSIS DEVICE FOR TEMPERATURE SENSOR

(75) Inventor: Yamato Sakurada, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 256 days.

(21) Appl. No.: 13/697,191

(22) PCT Filed: May 18, 2011

(86) PCT No.: PCT/JP2011/061405
§ 371 (c)(1),
(2), (4) Date: Nov. 9, 2012

(87) PCT Pub. No.: WO2011/148837
PCT Pub. Date: Dec. 1, 2011

(65) Prior Publication Data
US 2013/0058373 A1 Mar. 7, 2013

(30) Foreign Application Priority Data
May 24, 2010 (JP) .................................. 2010-117939

(51) Int. Cl.
G01K 15/00 (2006.01)
G01K 13/00 (2006.01)
G01K 3/00 (2006.01)
F02D 41/14 (2006.01)
F02D 41/22 (2006.01)
F02D 41/04 (2006.01)

(52) U.S. Cl.
CPC .......... F02D 41/1446 (2013.01); F02D 41/042 (2013.01); F02D 41/222 (2013.01); Y02T 10/40 (2013.01)

(58) Field of Classification Search
USPC ............................... 374/1, 141, 144, 166, 110
See application file for complete search history.

(56) References Cited

FOREIGN PATENT DOCUMENTS

| JP | 2000-45851 | 2/2000 |
| JP | 2000-303898 | 10/2000 |
| JP | 2003-3939 | 1/2003 |
| JP | 2004-339969 | 12/2004 |
| JP | 2006-274897 | 10/2006 |
| JP | 2007-096023 A | 4/2007 |
| JP | 2007-192045 A | 8/2007 |
| JP | 2010-077926 A | 4/2010 |
| JP | 2010-096023 A | 4/2010 |

OTHER PUBLICATIONS

International Search Report of PCT/JP2011/061405, dated Jun. 1, 2011, mailed Jun. 28, 2011.
The Japanese Notification of Reasons for Rejection of corresponding Japanese Application No. 2010-117939, issued on Feb. 12, 2013.
An English translation of the Chinese Office Action for the corresponding Chinese Application No. 201180025661.4, issued on Nov. 3, 2014.

*Primary Examiner* — Mirellys Jagan
(74) *Attorney, Agent, or Firm* — Global IP Counselors, LLP (57) ABSTRACT

A fault diagnosis device conducts a fault diagnosis in a temperature sensor. At starting an internal combustion engine, a thermal equilibrium condition may be established and temperature deviations of temperatures detected by at least two reference temperature sensors from each other may be equal to or less than a predetermined value, with the temperatures detected by the reference temperature sensors being greatly deviated from one detected by a temperature sensor being diagnosed. In this case, if the temperatures detected by the reference temperature sensors do not drop by a predetermined temperature or more from starting the engine until a predetermined time elapses, the fault diagnosis device determines that the temperature sensor being diagnosed is faulty.

8 Claims, 6 Drawing Sheets

FAULT DIAGNOSIS DEVICE FOR TEMPERATURE SENSOR

CROSS-REFERENCE TO RELATED APPLICATIONS

This application is a U.S. National stage application of International Application No. PCT/JP2011/061405, filed May 18, 2011, which claims priority claims priority under to Japanese Patent Application No. 2010-117939, filed in Japan on May 24, 2010, the entire contents of which is hereby incorporated by reference.

BACKGROUND OF THE INVENTION

1. Field of the Invention

The present invention generally relates to a fault diagnosis device that executes a fault diagnosis of at least three sensors each configured to detect a temperature of a different measurement entity.

2. Background Information

A known technology for executing a fault diagnosis of a temperature sensor uses detection values of several reference temperature sensors that are different from the temperature sensor being subjected to fault diagnosis.

Japanese Laid-Open Patent Application No. 2004-339969, for example, discloses a technology that includes a radiator, a cooling water passage that circulates cooling water of an internal combustion engine to the radiator, a thermostat that opens and closes the cooling water passage according to a cooling water temperature inside the cooling water passage, a radiator-side cooling water temperature that detects a cooling water temperature at a point located toward a radiator from the thermostat, an engine-side cooling water temperature that detects a cooling water temperature at a point located toward an engine from the thermostat, and an intake air temperature that detects an intake air temperature. If the temperature detected by the radiator-side cooling water temperature sensor is greatly different from the temperature detected by the engine-side cooling water temperature sensor and the temperature detected by the intake air temperature sensor after the engine has been stopped for a predetermined amount of time corresponding to when the temperatures near each of the sensors should be substantially equal to an outside ambient temperature, then the radiator-side cooling water temperature sensor is determined to have faulted regardless of whether the temperature detected by the engine-side cooling water temperature sensor and the temperature detected by the intake air temperature sensor are close together.

However, with the technology of Japanese Laid-Open Patent Application No. 2004-339969, since the timing at which the temperature sensor fault diagnosis is executed occurs after the engine has been stopped for a predetermined amount of time corresponding to when the temperatures near each of the radiator-side cooling water temperature sensor, the engine-side cooling water temperature sensor, and the intake air temperature sensor should be substantially equal to the outside ambient temperature, it is not possible to execute a fault diagnosis of the temperature sensors when the engine is started before the predetermined amount of time has elapsed and the fault diagnosis of the temperature sensors will tend to be delayed.

SUMMARY

Therefore, a temperature sensor fault diagnosis device according to the present invention has at least three sensors each configured to detect a temperature of a different measurement entity and executes a fault diagnosis by treating one temperature sensor among the three or more temperature sensors as a temperature sensor being subjected to fault diagnosis and determining if a fault has occurred in the temperature sensor being subjected to fault diagnosis. After the internal combustion engine has been stopped and a deviation of temperatures detected by at least two reference temperature sensors that are among the three or more temperature sensors but different from the temperature sensor being subjected to fault diagnosis is equal to or smaller than a predetermined value, the temperature sensor being subjected to fault diagnosis is determined to be faulty if a difference between the temperatures detected by the reference temperature sensors and the temperature detected by the temperature sensor being subjected to fault diagnosis is equal to or larger than a predetermined value. After an internal combustion engine is stopped, various portions of the internal combustion engine and the vehicle in which the internal combustion engine is installed reach a thermal equilibrium state and the temperatures detected by the temperature sensors serving to detect the temperatures of different measurement entities approach one another asymptotically. That is, when each portion of the internal combustion engine reaches the thermal equilibrium state, the differences between the temperatures detected by the temperature sensors will be small even though the temperature sensors detect the temperatures of different measurement entities.

With the present invention, even if the predetermined amount of time has not elapsed since the internal combustion engine was stopped, the fault diagnosis of the temperature sensor to be subjected to fault diagnosis can be executed when each portion of the internal combustion engine reach the thermal equilibrium state. As a result, the fault diagnosis of the temperature sensor can be executed efficiently.

DETAILED DESCRIPTION OF THE PREFERRED EMBODIMENTS

An embodiment of the present invention will now be explained based on the drawings.

Figure 1:
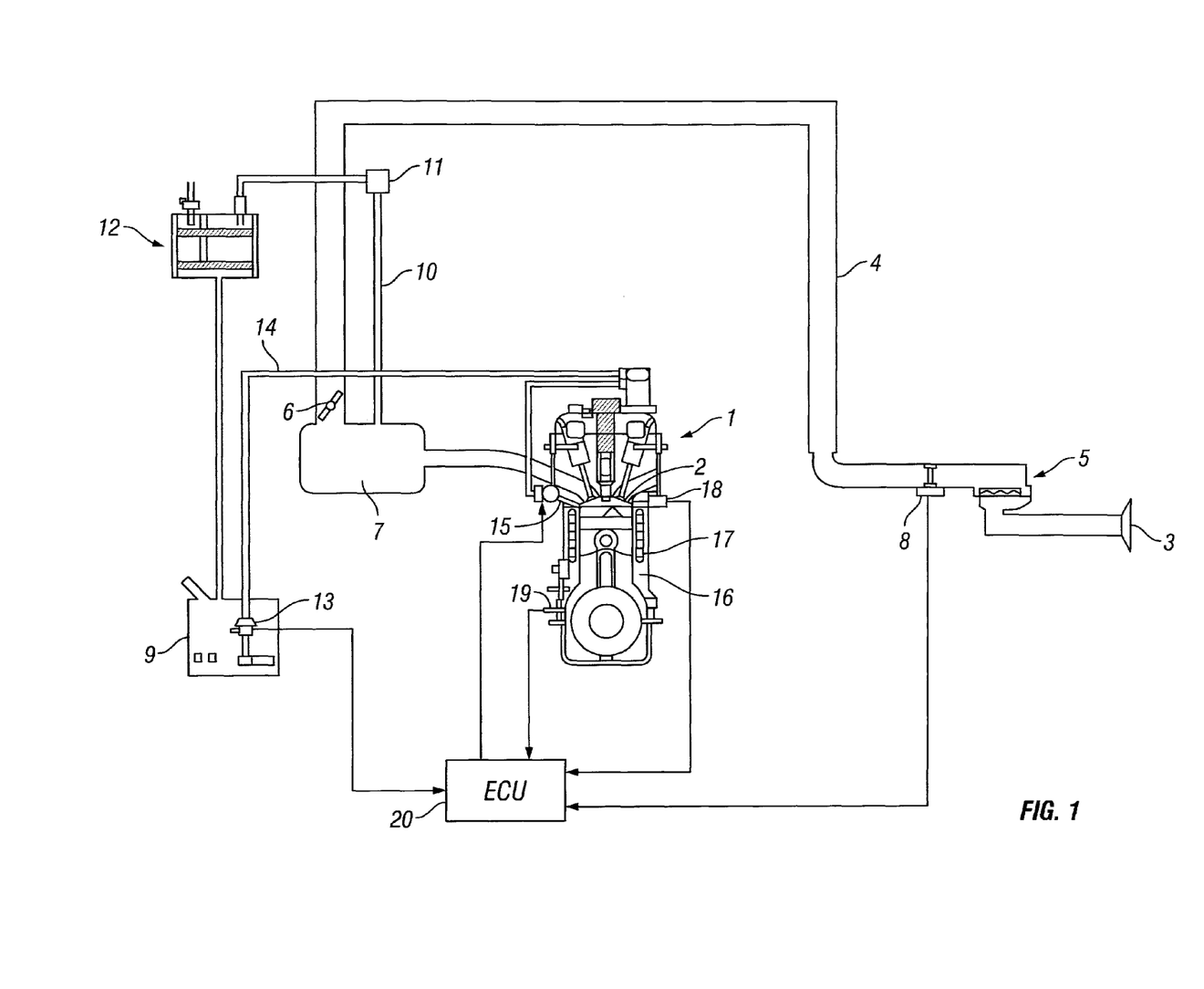
FIG. 1 is a simple diagram illustrating constituent features of an internal combustion engine system in which the present invention is employed.

FIG. 1 is a simple diagram illustrating constituent features of an internal combustion engine system in which the present invention is employed.

Air is drawn in through an intake air port 3 that is open to the atmosphere and guided through an intake air passage 4 to a combustion chamber 2 of an internal combustion engine 1 installed in a vehicle.

An air filter 5, a throttle valve 6, and a collector 7 are provided in the intake air passage 4 in order as listed from upstream to downstream.

An intake air temperature sensor 8 is provided between the air cleaner 5 and the throttle valve 6. The intake air temperature sensor 8 is provided inside an air flow meter.

A purge passage 10 is connected to the intake air passage 4 at a position downstream of the throttle valve 6 and serves to introduce fuel vapor generated in a fuel tank 9. A purge control valve 11 is installed in the purge passage 10, and a canister 12 is connected to the purge passage 10 to treat fuel vapor from the fuel tank 9.

A fuel temperature sensor 13 is provided in the fuel tank 9 to detect a fuel temperature in the fuel tank 9. The fuel inside the fuel tank 9 is supplied through a fuel supply passage 14 to a fuel injection valve 15 that serves to inject fuel directly into the combustion chamber 2.

A water temperature sensor 18 that detects a cooling water temperature inside a water jacket 17 and an oil temperature sensor 19 that detects an engine oil temperature are provided in a cylinder block 16 of the internal combustion engine 1.

Detection signals from the intake air temperature sensor 8, the fuel temperature sensor 13, the water temperature sensor 18, and the oil temperature sensor 19 are fed to an ECU (engine control unit) 20 that executes various controls of the internal combustion engine 1. The ECU 20 has an internal microcomputer, serves to execute various controls of the internal combustion engine 1, and executes processing based on signals from the sensors.

In this embodiment, when the internal combustion engine 1 is stopped while in a warmed-up state, a fault diagnosis of the four sensors comprising the intake air temperature sensor 8, the fuel temperature sensor 13, the water temperature sensor 18, and the oil temperature sensor 19 is executed inside the ECU 20.

When a sufficient amount of time has elapsed after the internal combustion engine 1 is stopped, the internal combustion engine 1 and the vehicle in which the internal combustion engine is installed reach a thermal equilibrium state and the temperatures detected by the intake air temperature 8, the fuel temperature sensor 13, the water temperature sensor 18, and the fuel temperature sensor 19 approach one another asymptotically. That is, when the various parts of the internal combustion engine 1 reach the thermal equilibrium state, the differences between the temperatures detected by the temperature sensors will be small even though the temperature sensors detect the temperatures of different measurement entities. In the equilibrium state, a temperature sensor outputting an abnormal value can be identified by merely comparing the detection values of the sensors 8, 13, 18, and 19, which detect different temperatures when the internal combustion engine 1 is running.

When a fault diagnosis will be executed with respect to one temperature sensor among the intake air temperature sensor 8, the fuel temperature sensor 13, the water temperature sensor 18 and the oil temperature sensor 19, the temperature sensor that will undergo the fault diagnosis is called a first temperature sensor and treated as a temperature sensor to be subjected to fault diagnosis and the remaining three sensors are called second, third, and fourth temperature sensors and treated as reference temperature sensors. After the internal combustion engine 1 has been stopped and the deviation of temperatures detected by the reference temperature sensors has become equal to or smaller than a predetermined value, the temperature sensor being subjected to fault diagnosis is determined to be faulty if the deviation between the temperatures detected by the reference temperature sensors and the temperature detected by the temperature sensor being subjected to fault diagnosis is large. In other words, when the internal combustion engine 1 is started, the temperature sensor being subjected to fault diagnosis is determined to be faulty if the deviation of temperatures detected by the reference temperature sensors is equal to or smaller than a predetermined value and the deviation between the temperatures detected by the reference temperature sensors and the temperature detected by the temperature sensor being subjected to fault diagnosis is large. When a sensor fault diagnosis is executed at a time of starting the internal combustion engine 1, the condition for completing the sensor fault diagnosis (condition for finalizing the determination) is that the water temperature, the oil temperature, and the intake air temperature do not decrease by more than a predetermined temperature during a period from when the internal combustion engine 1 is started until a predetermined amount of time has elapsed. With such a condition, if the water temperature, the oil temperature, and the intake air temperature decrease by more than the predetermined temperature during the period from when the internal combustion engine 1 is started until the predetermined amount of time has elapsed, then the fault diagnosis of the temperature sensor (finalization of the determination result) is not executed. Although there three temperature sensors serving as reference temperature sensors in this embodiment, the invention is not limited to three. So long as there are at least two other temperature sensors in addition to the temperature sensor being subjected to fault diagnosis, those other temperature sensors can serve as reference temperature sensors.

Figure 2:
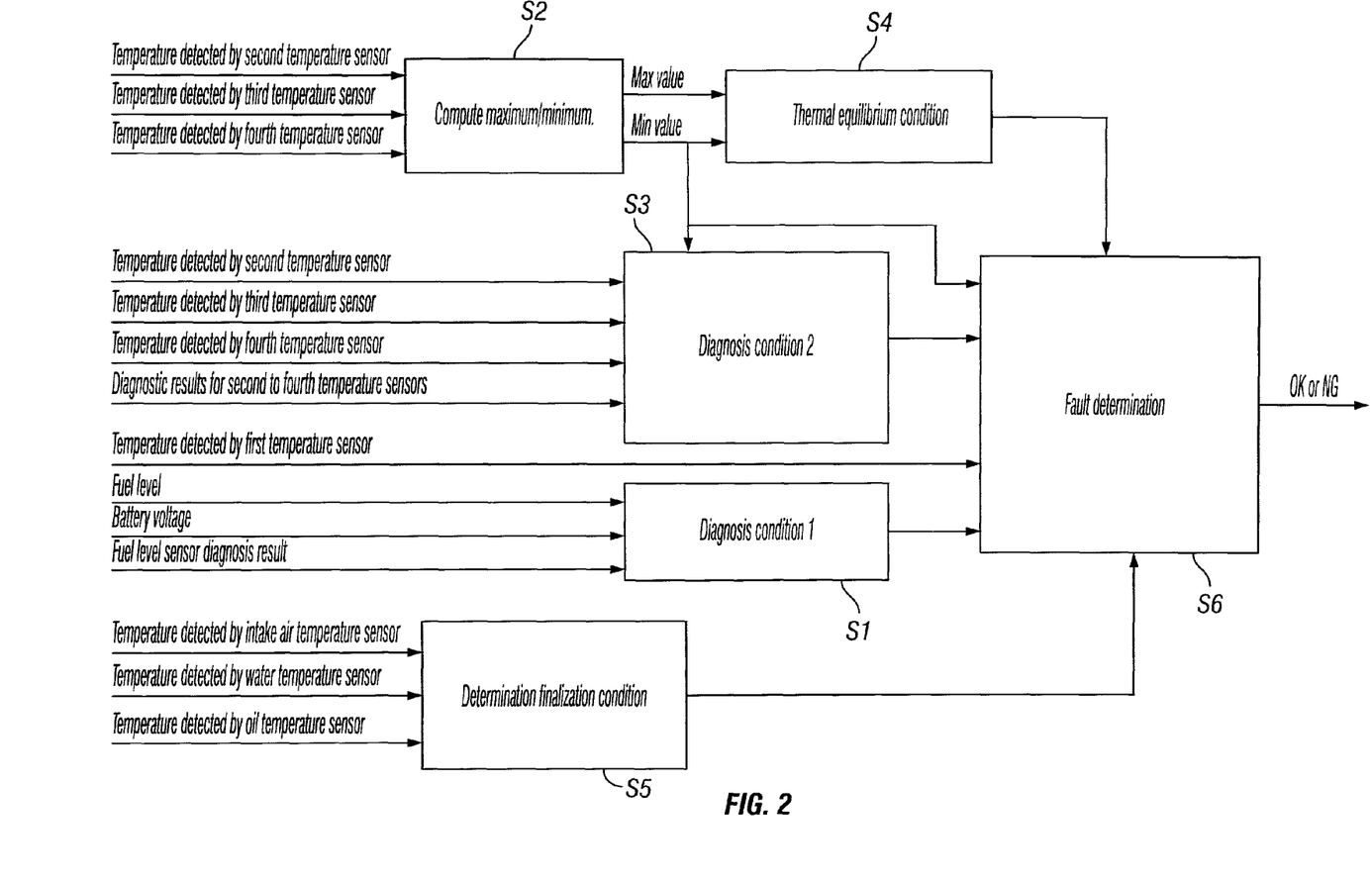
FIG. 2 is a block diagram related to a temperature sensor fault diagnosis according to the present invention.

FIG. 2 is a block diagram related to a temperature sensor fault diagnosis according to the present invention. In this embodiment, it is assumed that the fault diagnosis is executed at the time of keyon.

In step S1, the ECU 20 determines if a set of diagnosis conditions 1 is satisfied. In step S1, the ECU 20 receives such information as a voltage of a battery (not shown) installed in the vehicle, a fuel level inside the fuel tank 9 detected by a fuel level sensor (not shown), a fault diagnosis result of the fuel level sensor (not shown), and a previous operating time of the internal combustion engine 1. The ECU 20 then determines that the diagnosis conditions 1 are satisfied if all four of the conditions a1 to a4 explained below are satisfied. The conditional is the condition that the battery voltage is equal to or higher than a predetermined voltage (e.g., 11 V). The condition a2 is the condition that the vehicle is in a key-off period (in a period spanning from when the internal combustion engine 1 was stopped until the next time the internal combustion engine 1 is to be started) and is not being refueled. For example, this condition might be determined to be satisfied if a difference between the fuel level at the time when the internal combustion engine 1 was stopped (key-off) and the fuel level at the time when the internal combustion engine 1 is to be started (keyon) is equal to or smaller than a predetermined value (e.g., 15 liters or smaller). The condition a3 is the condition that the operating time of the internal combustion engine 1 before the internal combustion engine was stopped (before key-off) is equal to or larger than a predetermined amount of time (e.g., 20 minutes). The condition a4 is the condition that the fuel level sensor has not been determined to be faulty.

The information regarding a fault of the fuel level sensor is assumed to be a diagnosis result of a separate existing fault diagnosis. In this patent specification, "time of key-off" is defined to mean a point in time when the internal combustion engine 1 is stopped, i.e., a point in time immediately after the internal combustion engine 1 has been stopped, and "time of keyon" is defined to mean a point in time when the internal combustion engine 1 is started from a stopped state, i.e., a point in time immediately after the internal combustion engine 1 has been started. Meanwhile, "during a key-off period" means during a period spanning from a point in time when the internal combustion engine 1 was turned off until the next time the internal combustion engine 1 is started.

The conditional is established because the output values of the temperature sensors will vary if the battery voltage is low. The condition a2 is established because the fuel temperature changes inside the fuel tank when the fuel tank is refueled. The condition a3 is established because the fault diagnosis of this embodiment is based on the assumption that the engine was stopped after having become warm. The condition a4 is established because it is not possible to determine whether the condition a2 is satisfied when the fuel level sensor is faulty.

In step S1, in order to avoid a dead zone of the fuel level, it is acceptable to establish an upper limit value and a lower limit value of the fuel level and add another condition (condition a5) that the fuel level is between the upper limit value and the lower limit value to the conditions a1 to a4.

In step S2, the ECU 20 receives the temperatures detected by the second to fourth sensors serving as the reference temperature sensors at the time of keyon. These temperatures serve as a reference for comparing with the first temperature sensor, which is the temperature sensor being subjected to fault diagnosis. In step S2, the ECU 20 executes a maximum/minimum computation whereby it computes a maximum value (max value) and a minimum value (min value) among the received temperatures detected by the second to fourth sensors at the time of keyon.

In step S3, the ECU 20 determines if a set of diagnosis conditions 2 is satisfied. In step S3, the ECU 20 receives information regarding the temperatures detected by the second to fourth sensors at the time of key-off and the time of keyon, fault diagnosis results for the second to fourth sensors (i.e., whether a severed connection or a short circuit exists), and the min value from step S2. Based on the information, the ECU 20 determines that the diagnosis conditions 2 are satisfied if the five conditions b1 to b5 explained hereinafter are all satisfied. The information regarding faults of the second to fourth temperature sensors is assumed to be a diagnosis result of a separate existing fault diagnosis. The condition b1 is the condition that the temperatures detected by the second to fourth sensors at the time of key-off are within a predetermined temperature range. For example, if the water temperature sensor 18 and the oil temperature 19 are each used as one of the second to fourth temperature sensors, the condition might be that the water temperature and the oil temperature at the time of key-off is in the temperature range 70° C. to 120° C. The condition b2 is the condition that the second to fourth temperature sensors are not faulty. The condition b3 is the condition that the aforementioned min value is within a predetermined temperature range. For example, the min value is in the range −10° C. to 40° C. The condition b4 is the condition that if neither the fuel temperature sensor 13 nor the water temperature sensor 18 is the first temperature sensor, i.e., the temperature sensor to be subjected to fault diagnosis, then the ratio of a temperature decrease amount of the fuel during the key-off period with respect to a temperature decrease amount of the cooling water during the key-off period is equal to or smaller than a predetermined value. For example, the condition b4 might be determined to be satisfied when the ratio (temperature decrease amount of fuel)/(temperature decrease amount of cooling water) is equal to or smaller than 0.25. More specifically, for example, the condition b4 would be determined to be satisfied if the water temperature decreased from 100° C. to 20° C. and the fuel temperature decreased from 40° C. to 20° C. while the internal combustion engine 1 was stopped. Conversely, the condition b4 would not be determined to be satisfied if the water temperature decreased from 100° C. to 20° C. and the fuel temperature decreased from 50° C. to 20° C. while the internal combustion engine 1 was stopped. The condition b5 is the condition that if the intake air temperature sensor 8 is not the first temperature sensor, i.e., the temperature sensor to be subjected to fault diagnosis, then the temperature decrease amount of the intake air temperature during the key-off period is equal to or smaller than a predetermined value. For example, the condition b5 might be determined to be satisfied if the amount by which the intake air temperature decreased while the internal combustion engine 1 was stopped is smaller than 5° C.

The condition b1 is established because it is a precondition of the this embodiment that the fault diagnosis of the temperature sensor take place after the engine is warm. The condition b3 means the min value is within a temperature range that is possible for the outside ambient air. Since the temperatures can be anticipated to decrease according to the temperature sensor while the internal combustion engine 1 is stopped, the conditions b4 and b5 establish ranges within which the temperature decrease amounts are anticipated to lie. Since the temperature decrease amount of the cooling water and the temperature decrease amount of the fuel that occur while the internal combustion engine 1 is stopped are not the same, the condition b4 places a margin on this and, in this embodiment, sets the aforementioned prescribed value to 0.25.

In step S4, the ECU 20 determines if a thermal equilibrium condition is satisfied. In step S4, the ECU 20 receives information related to the min value and the max value computed in step S2 and uses this information to determine if the value obtained by subtracting the min value from the max value (max value−min value) is equal to or smaller than a prescribed value. If so, then the ECU 20 determines that the equilibrium condition is satisfied. More specifically, if, for example, the difference (max value−min value) is equal to or smaller than 6° C., then it is determined that the various parts of the internal combustion engine 1 and the vehicle in which the internal combustion engine 1 is installed are in a state of thermal equilibrium and the temperatures detected by the intake air temperature sensor 8, the fuel temperature sensor 13, the water temperature sensor 18, and the oil temperature sensor 19 are approaching one another asymptotically.

In step S5, the ECU 20 determines if a determination finalization condition is satisfied. In step S5, the ECU 20 receives the temperatures detected by the intake air temperature 8, the water temperature sensor 18, and the oil temperature sensor 19 and determines that the determination finalization condition is satisfied if the amounts by which all the detected temperatures decrease during a period from when the internal combustion engine was started (keyon) until a prescribed amount of time (e.g., 300 seconds) elapsed is equal to or smaller than a prescribed temperature (e.g., 3° C.). The determination finalization condition is provided in consideration of the fact that even if the value detected by the temperature sensor being subjected to fault diagnosis and the temperature detected by the reference temperature sensors differ by large amount, the large difference is not necessarily caused by a faulty sensor. The determination finalization condition will be explained in detail later.

In step S6, the ECU 20 executes a fault determination of the first temperature sensor, which is the temperature sensor being subjected to fault diagnosis. In step S6, the ECU 20 receives information related to the diagnosis conditions 1 from step S1, information related to the min value from step S2, information related to the diagnosis conditions 2 from step S3, information related to the thermal equilibrium state from step S4, and information related to the determination finalization condition from step S5. The ECU 20 then checks if diagnosis conditions 1 and 2 and the thermal equilibrium condition are satisfied and if a parameter X is outside a prescribed temperature range, the parameter X being a value calculated by subtracting the value detected by one of the reference temperature sensors (e.g., the min value) or a reference temperature based on the values detected by the reference temperature sensors (e.g., an average value) from the temperature detected by the first temperature sensor at the time of keyon. If these conditions are satisfied and the determination finalization condition is satisfied, then the ECU 20 determines the first temperature sensor, i.e., the temperature sensor being subjected to the fault diagnosis, is faulty. The prescribed temperature range of the parameter X is set to a range that the difference between the temperature detected by the first temperature sensor and the reference temperature would could not possibly lie outside if the temperature sensor were normal, i.e., a range outside of which the difference would only lie if the first temperature sensor were faulty. For example, when the diagnosis conditions 1 and 2 and the thermal equilibrium condition are satisfied and the parameter X is outside the range spanning from $-20°$ C. to $20°$ C., if the determination finalization condition is satisfied afterward, then the ECU 20 determines (finally) that the first sensor, i.e., the temperature sensor being subjected to the fault diagnosis, is faulty.

The reason the ECU 20 does not immediately determine that the first temperature sensor is faulty even if the parameter X is outside the prescribed temperature range (i.e., the reason a determination finalization condition is provided) is that the first temperature sensor may not be faulty even if the difference between the temperature detected by the first temperature sensor at the time if keyon and the temperatures detected by the second to fourth temperature sensors at the time of keyon is large.

For example, when a block heater is provided on the cylinder block 16 for starting the engine reliably under low temperature conditions, if the cylinder block 16 has been heated by the block heater, then the temperatures of the cooling water and the lubricating oil inside the cylinder block 16 will decrease when the cooling water and the lubricating oil circulate after the internal combustion engine 1 is started (after keyon). Therefore, satisfaction of the determination finalization condition (the condition that the temperatures of the cooling water and the lubricating oil have not decreased beyond a prescribed amount) is confirmed in order to ensure that such a temperature difference was not caused by the effect of the block heater before finally determining that the first temperature sensor (temperature sensor being subjected to fault diagnosis) is faulty.

If the amount of time since the engine last ran is short, then the temperature of air lingering inside the engine compartment may be higher than the outside ambient air temperature. Thus, when the engine is started, circulation of the air inside the engine compartment may cause the temperature of that air to decrease. Therefore, satisfaction of the determination finalization condition (the condition that the temperature of the intake air has not decreased beyond a prescribed amount) is confirmed in order to ensure that such a temperature difference was not caused by the effect of the temperature of air inside the engine compartment before finally determining that the first temperature sensor (temperature sensor being subjected to fault diagnosis) is faulty.

Figure 3:
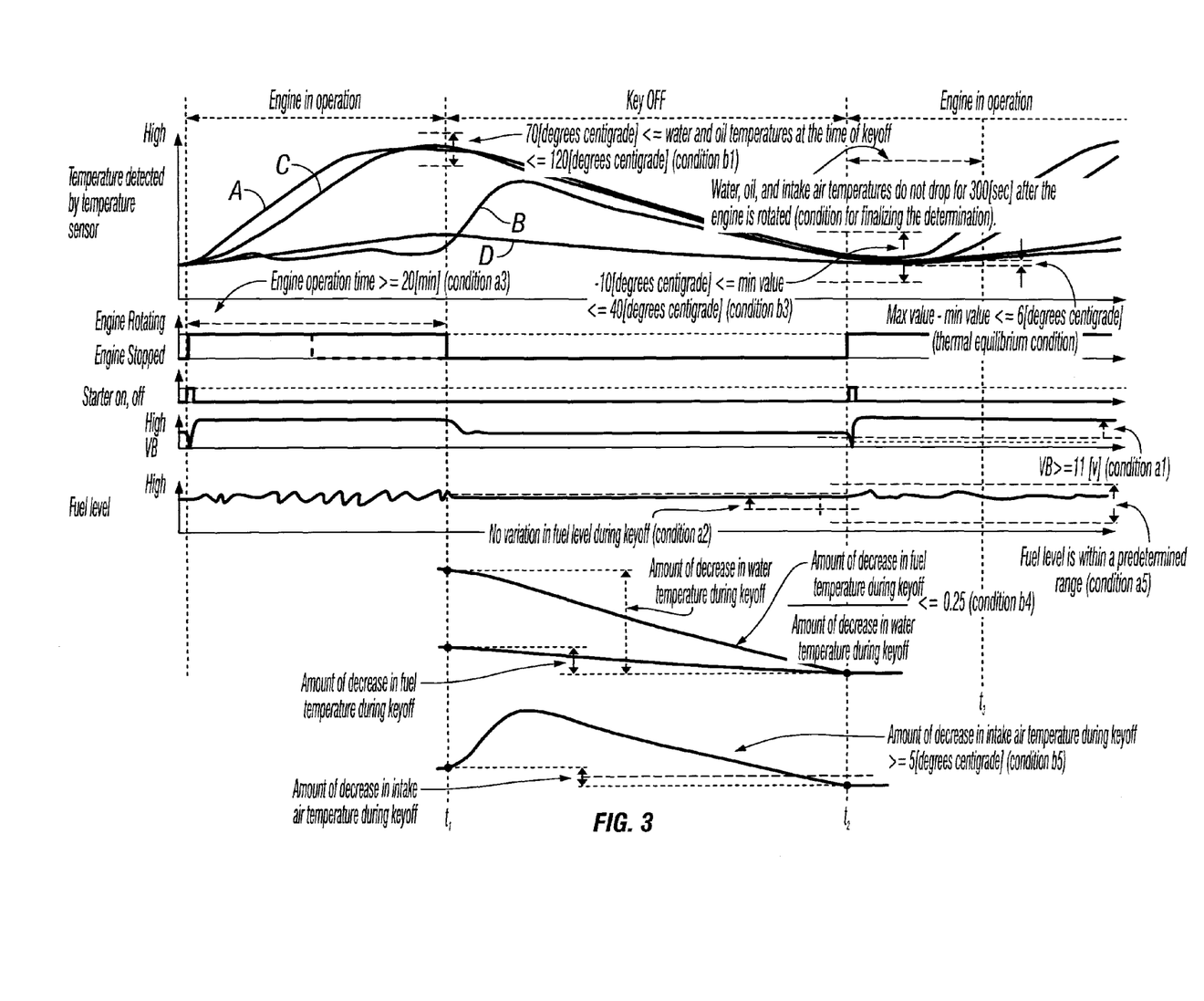
FIG. 3 is a time chart showing states of the vehicle and how the water temperature, the intake air temperature, the oil temperature, and the fuel temperature vary before, during, and after a keyoff period.

FIG. 3 is a time chart showing states of the vehicle and how the water temperature, the intake air temperature, the oil temperature, and the fuel temperature vary before, during, and after a key-off period. FIG. 3 illustrates a case in which none of the intake air temperature sensor 8, the fuel temperature sensor 13, the water temperature sensor 18, and the oil temperature sensor 19 is faulty. In FIG. 3, the characteristic curve A indicates the water temperature, the characteristic curve 13 indicates the intake air temperature, the characteristic curve C indicates the oil temperature, and the characteristic curve D indicates the fuel temperature. In this case, regardless of which temperature sensor is subjected to the fault diagnosis, the temperature sensor will ultimately be diagnosed to be normal.

At the time of key-off, i.e., at a time t1, the ECU 20 determines the amount of time the internal combustion engine 1 was in operation before the internal combustion engine 1 was stopped (before key-off) and detects the water temperature and the oil temperature. The ECU 20 then determines if the condition a3 of the diagnosis conditions 1 and the condition b1 of the diagnosis conditions 2 are satisfied. The ECU 20 also detects the temperatures of the measurement entities of the temperature sensors among the temperature sensors 8, 13, 18, and 19 that correspond to the second to fourth temperature sensors. It is also acceptable if these control steps are not completed at the time of key-off but, instead, the detection values are temporarily stored and the control steps are executed based on the stored detection values at the time of keyon.

At the time of keyon, i.e., at a time t2, the ECU 20 detects the battery voltage, the fuel level, the water temperature, the intake air temperature, the oil temperature, and the fuel temperature and determines if the conditions a1 and a2 of the diagnostic conditions 1 and the conditions b3, b4, and b5 of the diagnostic conditions 2 are satisfied as well as if the equilibrium condition is satisfied.

Additionally, at the time t2, the ECU 20 determines if the value (parameter X) obtained by subtracting the min value from the temperature detected by the first temperature sensor, i.e., the temperature sensor being subjected to fault diagnosis, is within a predetermined temperature range. For example, the ECU 20 determines if the condition $-20°$ C.$\leq$parameter X$\leq 20°$ C. is satisfied.

At a time t3 occurring a predetermined amount of time (e.g., 300 seconds) after keyon is a time when the ECU 20 determines if the previously explained determination finalization condition is satisfied. At the time t3, the ECU 20 determines if the determination finalization condition is satisfied and determines if the first temperature sensor, i.e., the temperature sensor being subjected to failure diagnosis, is faulty. That is, the time at which the first temperature sensor, i.e., the temperature sensor being subjected to failure diagnosis, is determined to be faulty is the time t3.

Figure 4:
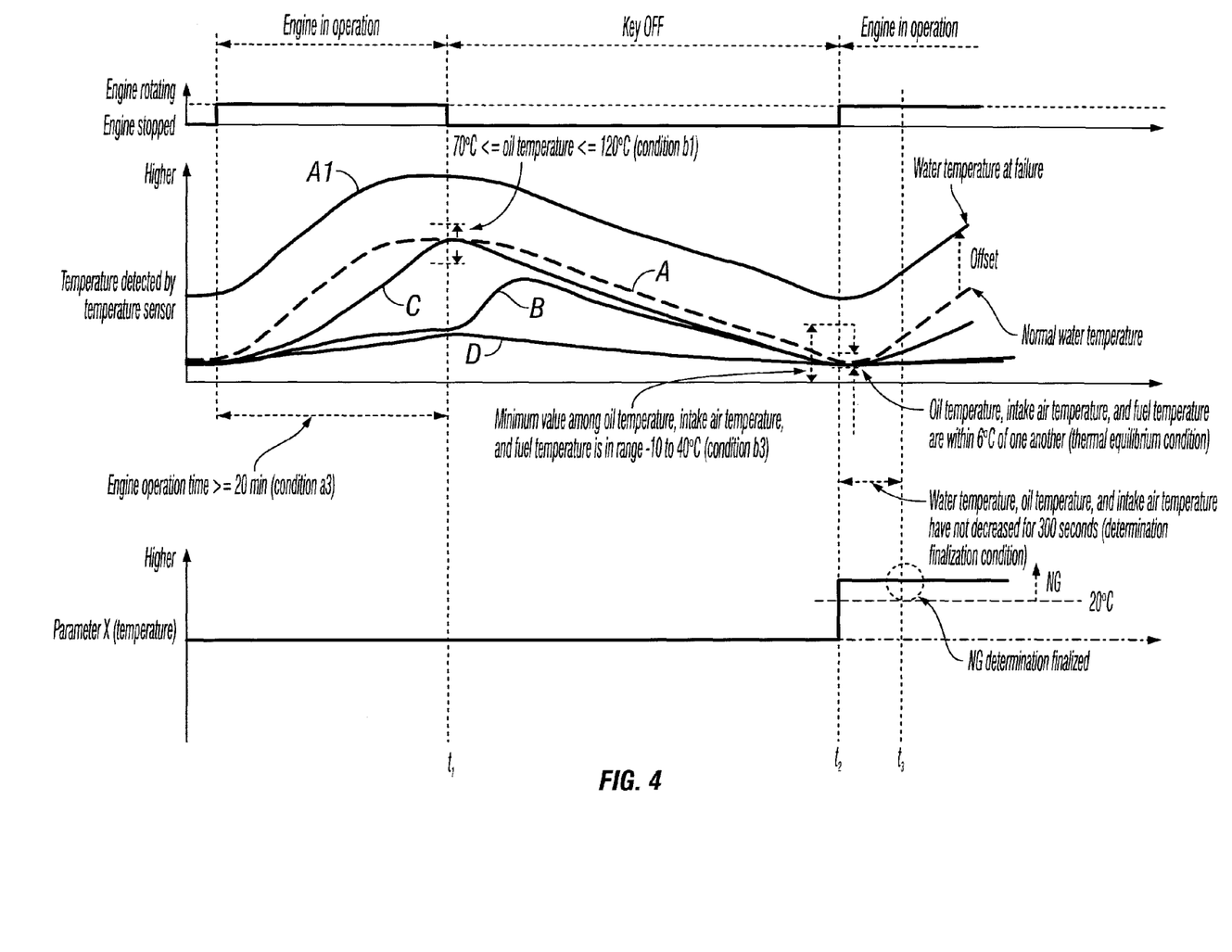
FIG. 4 is a time chart showing how the water temperature, the intake air temperature, the oil temperature, and the fuel temperature vary before, during, and after a keyoff period in a case where the water temperature sensor is faulty.

FIG. 4 is a time chart showing how the water temperature, the intake air temperature, the oil temperature, and the fuel temperature vary before, during and after a key-off period in a case where the water temperature sensor 18 is faulty. In the case shown, the water temperature sensor 18 is the temperature sensor subjected to the fault diagnosis.

In FIG. 4, the characteristic curve A1 indicates the water temperature (for a case in which a fault exists), the characteristic curve B indicates the intake air temperature, the characteristic curve C indicates the oil temperature, and the characteristic curve D indicates the fuel temperature. The characteristic curve A shown with a broken line in FIG. 4 indicates the water temperature for a case in which the water temperature sensor 18 is normal.

In FIG. 4, the diagnosis conditions 1, the diagnosis conditions 2, and the thermal equilibrium condition are satisfied and the temperature detected by the water temperature sensor 18 (first temperature sensor) is separated from the min value by 20° C. or more at the time of keyon, i.e., at the time t2. Next, if the water temperature, the oil temperature, and the intake air temperature have not decreased by more than a predetermined temperature (e.g., 3° C.) at the time t3 occurring a predetermined amount of time (e.g., 300 seconds) after keyon, i.e., during the period from the time t2 to the time t3, then the determination finalization condition is determined to be satisfied and the water temperature sensor 18 is determined to be faulty.

Thus, even if the detection value of the water temperature sensor 18 is not normal at the time t2, the ECU 20 does not determine that the water temperature sensor 18 is faulty until the determination finalization condition is satisfied at the time t3. Only at the time t3 when the determination finalization condition is satisfied does the ECU 20 determine that the temperature sensor 18 is faulty.

Figure 5:
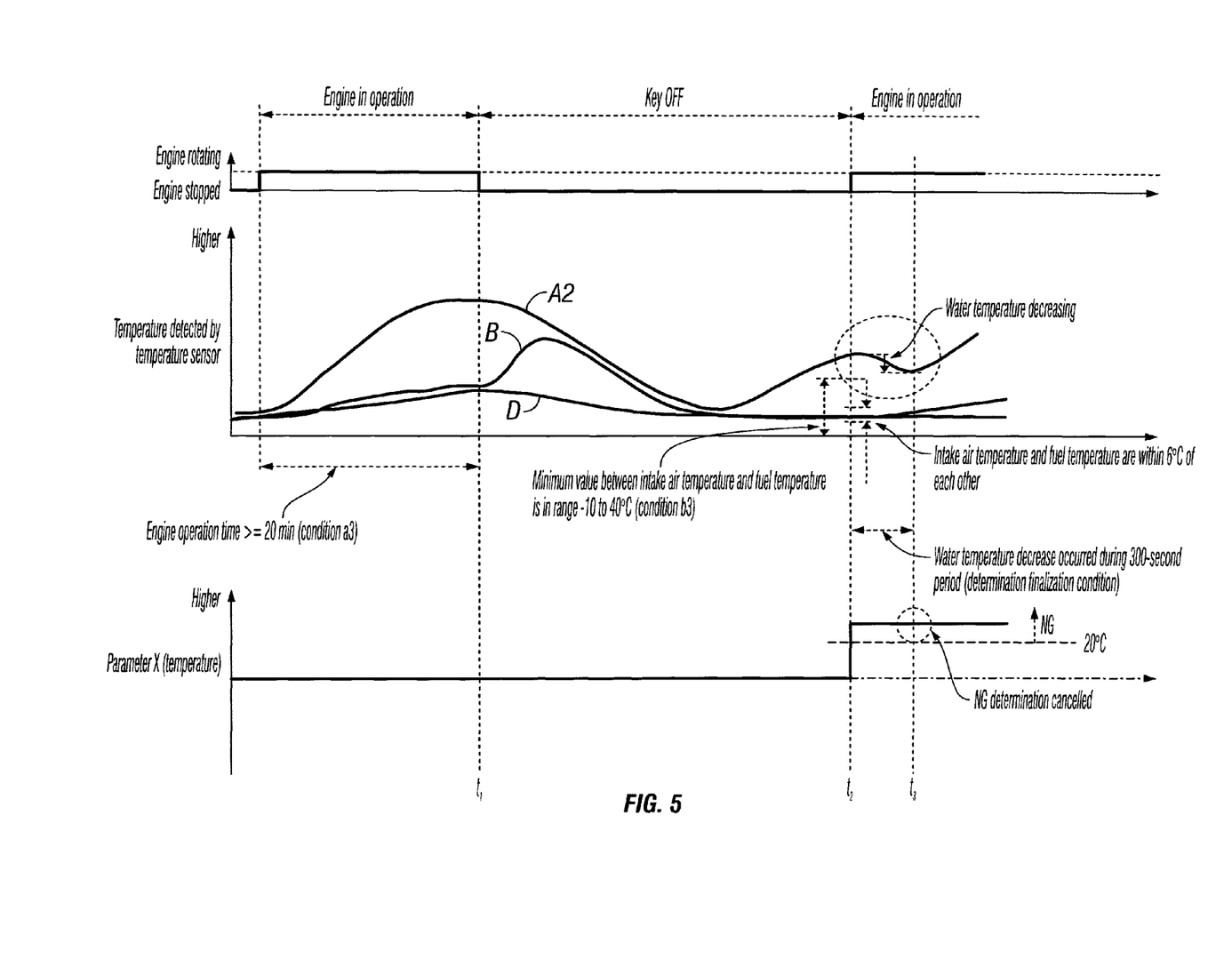
FIG. 5 is a time chart showing how the water temperature, the intake air temperature, and the fuel temperature vary before, during, and after a keyoff period in a case where the cylinder block has been heated with a block heater during the keyoff period.

FIG. 5 is a time chart showing how the water temperature, the intake air temperature, and the fuel temperature vary before, during, and after a key-off period in a case where the cylinder block 16 has been heated with a block heater (not shown) provided on the cylinder block 16 the during the key-off period. In FIG. 5, the characteristic curve A2 indicates the water temperature, the characteristic curve B indicates the intake air temperature, and the characteristic curve d indicates the fuel temperature. Thus, FIG. 5 illustrates a case in which the intake air temperature sensor 8 and the fuel temperature sensor 13 are used as reference temperature sensors and a fault diagnosis is executed with respect to the water temperature sensor 18 (the temperature sensor subjected to fault diagnosis).

In FIG. 5, the diagnosis conditions 1, the diagnosis conditions 2, and the thermal equilibrium condition are satisfied and the temperature detected by the water temperature sensor 18 (first temperature sensor) is separated from the min value by 20° C. or more at the time of keyon, i.e., at the time t2. However, since the reason the water temperature is high at the time of keyon is that the cylinder block 16 was heated by the block heater during the key-off period, the water temperature inside the cylinder block 16 decreases due to circulation of the cooling water after the internal combustion engine 1 is started. Consequently, during the period from the time t2 to the time t3, the water temperature decreases by an amount larger than a predetermined temperature (e.g., 3° C.) and the determination finalization condition is determined not to be satisfied at the time t3.

Thus, in the example shown in FIG. 5, the even though the value detected by the water temperature sensor 18 is not normal at the time t2, the determination finalization condition is not satisfied at the time t3 and, consequently, the water temperature sensor 18 is not determined to be faulty.

Figure 6:
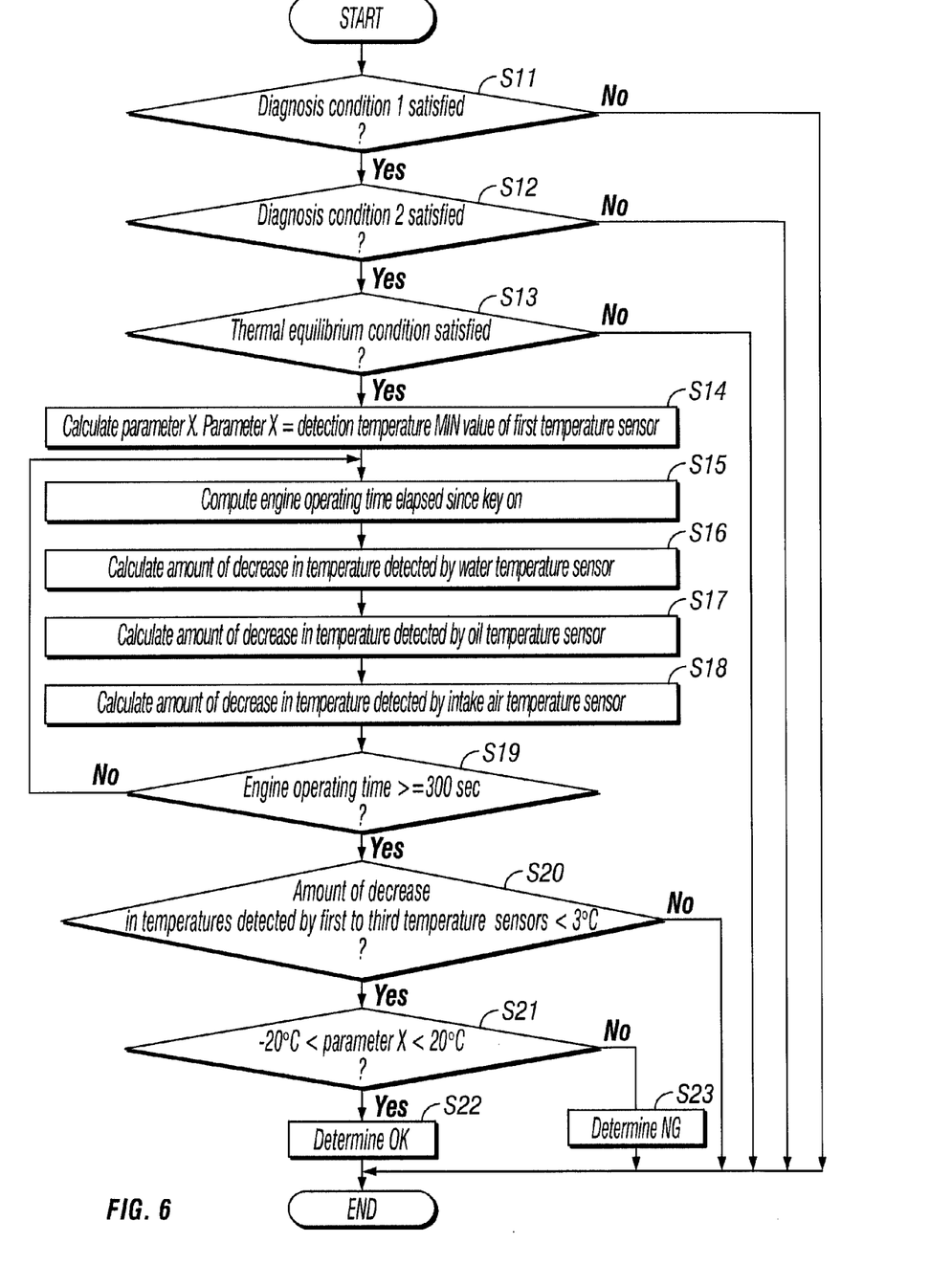
FIG. 6 is a flowchart showing control steps of a temperature sensor fault diagnosis according to an embodiment.

FIG. 6 is a flowchart showing control steps of a temperature sensor fault diagnosis according to this embodiment. In this embodiment, the control sequence begins at the time of keyon.

In step S11, the ECU 20 determines if the diagnosis conditions 1 are satisfied. If all of the diagnosis conditions 1 are satisfied, then the ECU 20 proceeds to step S12. If not, then the fault diagnosis of the temperature sensor being subjected to fault diagnosis is not executed in the current control cycle.

In this embodiment, detection values stored in advance at the time of key-off are used as the temperature and the fuel level values at the time of key-off.

In step S12, the ECU 20 determines if the diagnosis conditions 2 are satisfied. If all of the diagnosis conditions 2 are satisfied, then the ECU 20 proceeds to step S13. If not, then the fault diagnosis of the temperature sensor being subjected to fault diagnosis is not executed in the current control cycle.

In step S13, the ECU 20 determines if the thermal equilibrium condition is satisfied. If all of the thermal equilibrium condition is satisfied, then the ECU 20 proceeds to step S14. If not, then the fault diagnosis of the temperature sensor being subjected to fault diagnosis is not executed in the current control cycle.

In step S14, the ECU 20 calculates the parameter X as the value obtained by subtracting the minimum value (min value) among the temperatures detected by the second to fourth temperature sensors at the time if keyon from the temperature detected by the first temperature sensor at the time of keyon.

In steps S15 to S20, the ECU 20 determines if the determination finalization condition is satisfied. More specifically, in step S15 the ECU 20 computes the amount of time the internal combustion engine 1 has been operating since keyon, and in steps S16 to S19 the ECU 20 determines if the decrease amounts of the water temperature detected by the water temperature sensor 18, the oil temperature detected by the oil temperature sensor 19, and the intake air temperature detected by the intake air temperature sensor 8 during the period spanning 300 seconds after keyon are all smaller than 3° C. If the water temperature, the oil temperature, and the intake air temperature have all decreased by an amount smaller than 3° C., then the ECU 20 proceeds to step S21. Otherwise, the ECU 20 ends the current control cycle without executing the fault diagnosis of the temperature sensor being subjected to fault diagnosis.

In step S21, the ECU 20 determines if the condition −20° C.<parameter X<20° C. is satisfied. If the parameter X is not in the range between −20° C. and 20° C., then the ECU 20 determines that the deviation between the reference temperature sensor and the temperature sensor being subjected to fault diagnosis is large and proceeds to step S22. If the parameter X is in the range between −20° C. and 20° C., then the ECU 20 determines that the deviation between the reference temperature sensor and the temperature sensor being subjected to fault diagnosis is not large and proceeds to step S23.

In step S22 the ECU 20 determines that the temperature sensor being subjected to fault diagnosis is not faulty, and in step S23 the ECU determines that the temperature sensor being subjected to fault diagnosis is faulty.

As explained previously, with this embodiment, since the fault diagnosis of the temperature sensor being subjected to fault diagnosis is started when the deviation of the temperatures detected by the reference sensors serving as a basis for comparison with the temperature sensor being subjected to fault diagnosis is equal to or smaller than a predetermined value, the fault diagnosis of the temperature sensor being subjected to fault diagnosis can be executed even if the predetermined amount of time has not elapsed since the internal combustion engine 1 was stopped so long as the thermal equilibrium condition exists at the various portions of the internal combustion engine 1.

That is, the fault diagnosis of the temperature sensor being subjected to fault diagnosis is not started in accordance with the amount of time elapsed since the engine stopped but, instead, can be executed at a point in time when it becomes possible to execute the fault diagnosis of the temperature sensor being subjected to fault diagnosis. As a result, the fault diagnosis of the temperature sensor being subjected to fault diagnosis can be executed efficiently.

Also, since the fault diagnosis of the temperature sensor being subjected to fault diagnosis can be executed without measuring the amount of time from key-off to keyon, it is not necessary to provide a timer for measuring the amount of time from key-off to keyon while the internal combustion engine 1 is stopped.

Since the fault diagnosis of the temperature sensor being subjected to fault diagnosis is started when the temperatures detected by the two or more reference temperature sensors are within the predetermined range, the diagnosis is more robust than a diagnosis that uses one reference temperature sensor.

In particular, even if deviation between the temperature detected by the temperature sensor being subjected to fault diagnosis and the temperatures detected by the reference temperature sensors is large, the temperature sensor being subjected to fault diagnosis is not immediately determined to be faulty. Instead, the temperature sensor being subjected to fault diagnosis is determined to be faulty only if the temperatures detected by the reference temperature sensors have not decreased by an amount equal to or larger than a prescribed temperature. As a result, the accuracy of the fault diagnosis can be improved even further.

In this embodiment, in relation to executing the fault diagnosis of the temperature sensor being subjected to fault diagnosis, the aforementioned diagnosis conditions 1, diagnosis conditions 2, thermal equilibrium condition, and determination finalization condition are established and the fault diagnosis of the temperature sensor being subjected to fault diagnosis is executed when these conditions are satisfied. As a result, a robust diagnosis can be ensured regardless of which temperature sensor among the intake air temperature sensor 8, the fuel temperature sensor 13, the water temperature sensor 18, and the oil temperature sensor 19 is the temperature sensor being subjected to fault diagnosis and which are used as reference temperature sensors.

Although in the previously explained embodiment the intake air temperature sensor 8, the fuel temperature sensor 13, the water temperature sensor 18, and the oil temperature sensor 19 are presented as four examples of a temperature sensor, the invention is not limited to these four temperature sensors and any temperature sensors are acceptable that can be treated as the temperature sensor being subjected to fault diagnosis and as reference temperature sensors. For example, if an ATF oil temperature sensor that detects an oil temperature of an ATF of an automatic transmission is provided or a second intake air temperature sensor is provided immediately upstream of the throttle valve separately from the intake air temperature sensor installed inside the air flow meter, then the invention can be applied to this second intake air temperature sensor.

Although in the previously explained embodiment the diagnosis control is executed at the time of keyon, it is acceptable to, for example, execute the diagnosis control continuously during key-off periods and finalize the determination result when a condition is satisfied. In this way, after the internal combustion engine 1 has been stopped and the deviation of temperatures detected by the reference temperature sensors has become equal to or smaller than a prescribed value, the temperature sensor being subjected to fault diagnosis is determined to be faulty if the deviation between the temperatures detected by the reference temperature sensors and the temperature detected by the temperature sensor being subjected to fault diagnosis is large.

The invention claimed is:

1. A temperature sensor fault diagnosis device comprising:
a control unit;
at least three temperature sensors connected to the control unit, each of the at least three temperature sensors being configured to detect a temperature of a different measurement entity at various parts of an internal combustion engine or a vehicle in which the internal combustion engine is installed, the at least three temperature sensors including a water temperature sensor that detects a cooling water temperature of the internal combustion engine and an intake air temperature sensor that detects an intake air temperature of the internal combustion engine, and the control unit being configured to execute a fault diagnosis by treating one of the at least three temperature sensors as a subject temperature sensor being subjected to fault diagnosis and executing a fault diagnosis,
after the internal combustion engine has been stopped and a deviation of temperatures detected by at least two reference temperature sensors of the at least three temperature sensors but different from the subject temperature sensor being subjected to fault diagnosis is calculated continuously by the control unit, and upon the deviation becoming equal to or smaller than a predetermined value, the control unit determines the subject temperature sensor being subjected to fault diagnosis to be faulty if the deviation between the temperatures detected by the reference temperature sensors and the temperature detected by the subject temperature sensor being subjected to fault diagnosis is equal to or larger than a predetermined value, and if the temperatures detected by the reference temperature sensors have not decreased by an amount equal to or larger than a predetermined temperature during a period from when the internal combustion engine was started until a predetermined amount of time has elapsed.

2. The temperature sensor fault diagnosis device according to claim 1, wherein
the at least three temperature sensors include an oil temperature sensor that detects an oil temperature of engine oil of the internal combustion engine; and
the control unit determines the subject temperature sensor being subjected to fault diagnosis is not faulty while the internal combustion engine is running if any of the cooling water temperature of the internal combustion engine, the oil temperature of the internal combustion engine, and the intake air temperature of the internal combustion engine has decreased by an amount equal to or larger than a predetermined temperature during a period from when the internal combustion engine was started until a predetermined amount of time has elapsed.

3. The temperature sensor fault diagnosis device according to claim 1, wherein
the control unit executes the fault diagnosis of the subject temperature sensor being subjected to fault diagnosis while the temperatures detected by the reference temperature sensors are within a predetermined temperature range.

4. The temperature sensor fault diagnosis device according to claim 3, wherein
the at least three temperature sensors include an oil temperature sensor that detects an oil temperature of engine oil of the internal combustion engine; and
the control unit determines the subject temperature sensor being subjected to fault diagnosis is not faulty while the internal combustion engine is running if any of the cooling water temperature of the internal combustion engine, the oil temperature of the internal combustion engine, and the intake air temperature of the internal combustion engine has decreased by an amount equal to or larger than a predetermined temperature during a period from when the internal combustion engine was started until a predetermined amount of time has elapsed.

5. A temperature sensor fault diagnosis device comprising:
a control unit;
at least three temperature sensors connected to the control unit, each of the at least three temperature sensors being configured to detect a temperature of a different measurement entity at various parts of an internal combustion engine or a vehicle in which the internal combustion engine is installed, the at least three temperature sensors including a water temperature sensor that detects a cooling water temperature of the internal combustion engine and an intake air temperature sensor that detects an intake air temperature of the internal combustion engine, and the control unit being configured to execute a fault diagnosis by treating one temperature sensor of the at least three temperature sensors as a subject temperature sensor being subjected to fault diagnosis and executing a fault diagnosis,
upon the internal combustion engine being started and a deviation of temperatures detected by at least two reference temperature sensors of the at least three temperature sensors but different from the subject temperature sensor being subjected to fault diagnosis has become equal to or smaller than a predetermined value, the control unit determines the subject temperature sensor being subjected to fault diagnosis to be faulty if the deviation between the temperatures detected by the reference temperature sensors and the temperature detected by the subject temperature sensor being subjected to fault diagnosis is equal to or larger than a predetermined value, and if the temperatures detected by the reference temperature sensors have not decreased by an amount equal to or larger than a predetermined temperature during a period from when the internal combustion engine was started until a predetermined amount of time has elapsed.

6. The temperature sensor fault diagnosis device according to claim 5, wherein
the at least three temperature sensors include an oil temperature sensor that detects an oil temperature of engine oil of the internal combustion engine; and
the control unit determines the subject temperature sensor being subjected to fault diagnosis is not faulty while the internal combustion engine is running if any of the cooling water temperature of the internal combustion engine, the oil temperature of the internal combustion engine, and the intake air temperature of the internal combustion engine has decreased by an amount equal to or larger than a predetermined temperature during a period from when the internal combustion engine was started until a predetermined amount of time has elapsed.

7. The temperature sensor fault diagnosis device according to claim 5, wherein
the control unit executes the fault diagnosis of the subject temperature sensor being subjected to fault diagnosis while the temperatures detected by the reference temperature sensors are within a predetermined temperature range.

8. The temperature sensor fault diagnosis device according to claim 7, wherein
the at least three temperature sensors include an oil temperature sensor that detects an oil temperature of engine oil of the internal combustion engine; and
the control unit determines the subject temperature sensor being subjected to fault diagnosis is not faulty while the internal combustion engine is running if any of the cooling water temperature of the internal combustion engine, the oil temperature of the internal combustion engine, and the intake air temperature of the internal combustion engine has decreased by an amount equal to or larger than a predetermined temperature during a period from when the internal combustion engine was started until a predetermined amount of time has elapsed.

* * * * *